United States Patent
Powell et al.

[11] Patent Number: 5,427,853
[45] Date of Patent: Jun. 27, 1995

[54] REINFORCEMENT PREFORM, METHOD OF MAKING SAME AND REINFORCED COMPOSITE MADE THEREFROM

[75] Inventors: Bob R. Powell, Birmingham; Raymond L. Bloink, Swartz Creek, both of Mich.

[73] Assignee: General Motors Corporation, Detroit, Mich.

[21] Appl. No.: 169,251

[22] Filed: Dec. 20, 1993

[51] Int. Cl.[6] .................. B32B 5/02; B32B 15/00; B32B 18/00
[52] U.S. Cl. .................. 428/357; 428/358; 428/359; 428/360; 428/361; 428/606; 428/607; 252/389.31
[58] Field of Search ............ 428/357, 358, 359, 360, 428/361, 606, 607; 282/389.31

[56] References Cited

U.S. PATENT DOCUMENTS 5,171,560 12/1992 Tennent .................. 423/447

OTHER PUBLICATIONS

Fred F. Lange et al, "Method for Processing Metal-Reinforced Ceramic Composites", Journal of the American Ceramic Society, 73(2) pp. 388–393 (Feb. 1990).
David R. Clarke, "Interpenetrating Phase Composites", J. Am. Ceram. Soc., 75(4) pp. 739–759 (Apr. 1992).

*Primary Examiner*—Patrick J. Ryan
*Assistant Examiner*—Rich Weisberger

[57] ABSTRACT

A preform for impregnation of a metal or ceramic matrix material comprising a multiplicity of reinforcement particles bonded together so as to define a three-dimensional, open-cell reticulum comprising a plurality of randomly oriented thread-like portions interconnected one to the next via a plurality of nodes. A reinforced composite made from such preform and method of making the preform is disclosed/claimed wherein the reinforcement particles are mixed with prepolymers used to produce a fugitive binder for the particles comprising a foamed polymer, and the particles align themselves with the polymer portions of the resulting foam.

11 Claims, 2 Drawing Sheets

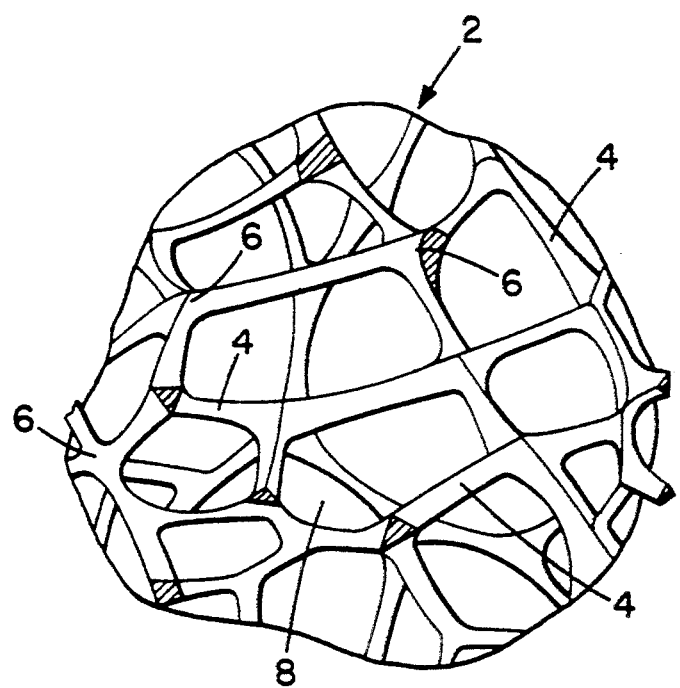

REINFORCEMENT PREFORM, METHOD OF MAKING SAME AND REINFORCED COMPOSITE MADE THEREFROM

This invention relates to reinforced composites including a unique preform adapted for impregnation with a matrix material and a method of making same.

BACKGROUND OF THE INVENTION

It is well known in the art to reinforce ceramics and light metals such as Al, Mg, etc. (i.e., the matrix material) by dispersing a variety of reinforcement particles throughout the material. Common reinforcing particles are carbon/graphite, $Al_2O_3$, glass, mica, SiC, wollastonite, alumino-silicate (e.g., Kao-wool), inter alia. Typically, the reinforcing particles will comprise about 3% by volume to about 30% by volume of the composite. The particles may be essentially equiaxed, or elongated (e.g., whiskers and fibers), and serve to improve the mechanical properties (e.g., strength, toughness, friction, fatigue resistance and wear resistance) of the composite over the properties of the metal or ceramic matrix material alone. Popular elongated particles (hereafter, fibrils) typically have an aspect ratio (i.e., length divided by diameter) of between about 3 to about 20. Their lengths vary from about 50 to about 200 microns and have diameters less than about 10 microns. Preferable lengths are between about 75 microns and 100 microns.

Reinforced composite materials are typically made by either one of two basic processes. In one process, reinforcements are simply mixed with the matrix material (e.g., molten metal) and together therewith cast as a slurry into an appropriate mold for shaping the finished product. In the other process, a self-supporting preform is made in the desired size and shape from the reinforcements, and the preform subsequently impregnated with the metal or ceramic matrix material by well known pressure or vapor infiltration techniques. In the latter process, it is particularly desirable that the preform be made to the actual size and configuration that it will be used in the finished molding/casting so that little or no subsequent machining or shaping thereof is required. According to this latter process, the preform is formed in an appropriate mold to the desired size and shape which may conform either (1) to that of the finished composite article, or (2) to only a particular defined portion of the finished composite article (e.g., a reinforced portion of an otherwise reinforcement-free article). Thereafter the preform is impregnated with the desired matrix material. The preform may be formed in a first mold and then transferred to a second mold where it is impregnated with the matrix material, or the preform may be formed and impregnated in the same mold.

A known technique for forming the preform comprises mixing the reinforcing particles uniformly throughout a fugitive binder (e.g., wax, polystrene, polyethylene, etc.), injecting the binder-particle mixture into a mold, removing (e.g., volatizing or dissolving) the binder, and finally bonding the residual particles together into a self-supporting structure. As is well known in the art, particle bonding may be achieved by sintering, or by providing the particles with a coating of colloidal $SiO_2$ which, upon heating, acts like a high temperature glue for holding the particles together. Some of the disadvantages of the mix and mold technique are (1) the ofttimes inability to completely fill the mold cavity with a homogeneous mixture of the particles, (2) upper limits on the amount of particles that can be used while still being able to inject the mix, (3) the need to remove a large volume of binder (i.e., about 60% to about 85% by volume of the preform mixture) and (4) difficulty in avoiding planar, unreinforced areas which arise from flow lines and mating lines in mold.

All in all, the use of preforms is considered to be the preferred way to make composite materials. However, it has heretofore been difficult to uniformly and completely impregnate the preforms at commercially acceptable rates. It would be desirable to provide a self-supporting preform, which is readily impregnated without untoward sacrifice of the physical property(s) sought to be enhanced by the reinforcements.

It is an object of the present invention to provide a self-supporting, heterogeneous, reinforcement preform, wherein reinforcement particles are in the form of an open-cell reticulum, defining a plurality of reinforcement-free pores/cells which are readily fillable with matrix material. It is a further object of the present invention to form the aforesaid preform while foaming a fugitive binder therefor. It is a still further object of the present invention to provide a heterogeneous, reinforced material comprising a metal or ceramic matrix phase embedding a reinforcement phase which reinforcement phase comprises a three-dimensional reticulum comprising a plurality of randomly oriented thread-like portions interconnected one to the next via a plurality of nodes. These and other objects and advantages of the present invention will become more readily apparent from the description thereof which follows.

The present invention permits the making of readily impregnated metal matrix composites (hereafter MMCs) which have good wear-resistance and frictional properties, and readily impregnated ceramic matrix composites (CMCs) which are tougher than ceramics made without the reinforcements. The present invention provides a heterogeneous composite having a substantially consistent distribution of the reinforcements throughout the composite but with concentrations of the reinforcements at certain locations throughout and very little reinforcements elsewhere in the composite.

THE INVENTION

In accordance with the present invention, there is provided a self-supporting preform adapted to be embedded in a metal or ceramic matrix material and comprising a multiplicity of discrete reinforcing particles bonded together in the form of a three-dimensional, open-cell reticulum. The reticulum comprises a plurality of randomly oriented, thread-like portions interconnected one to the next via a plurality of nodes, and together therewith defining a plurality of interconnected, interstitial pores/cells therebetween. The pores/cells will preferably have diameters between about 100 and about 200 microns. In accordance with one preferred embodiment of the invention, the particles comprise ceramics such as $Al_{23}$, $Al_2O_3.SiO_2(4\% \ SiO_2)$, SiC, $CaSiO_3$, BN, $Si_3N_4$, $Al_2O_3.SiO_2(53\% \ SiO_2)$ and $K_2O.6TiO_2$. In accordance with another preferred embodiment, the particles will be fibrils each having an aspect ratio of between about 3 and about 20. The preform is filled with an appropriate matrix material (i.e., metal or ceramic) so as to provide a heterogeneous, reinforced composite material comprising the matrix phase embedding the reinforcement phase wherein the reinforcement phase has the structure and configuration of the aforesaid reticulum.

In accordance with another aspect of the present invention, there is provided a method of making such a reticulated preform for reinforcing a composite comprising the steps of: (1) providing first and second prepolymers adapted to react with each other in such a manner as to foam and form a three-dimensional, fugitive, polymer reticulum comprising a plurality of randomly-oriented, thread-like portions interconnected one to the next via a plurality of nodes which together define a plurality of interconnected, interstitial cells; (2) mixing a plurality of discrete reinforcing particles with one or both of the prepolymers; (3) reacting the prepolymers (i.e., with the particles present) together in a mold having a mold cavity conforming substantially to the desired shape of the preform, and so as to foam the reacting mixture as it polymerizes, and so as to concentrate the particles at the polymer portions of the foam which define the pores/cells; (4) removing the polymer (e.g., as by burning or dissolution) so as to leave the particles in place; and (5) bonding the particles together to provide a substantially self-supporting preform adapted to be filled with a matrix material. Bonding may be effected by sintering or by means of an $SiO_2$ binder as is well known in the art. Thereafter the preform is impregnated with the desired matrix material (e.g., metal or ceramic).

Any foamable polymer can be used provided it yields an open-cell foam and can be readily removed (e.g., dissolved or burned-out) after polymerization is complete. Polyurethane and silicone foams are seen to be particularly convenient for this purpose. Regardless of the particular polymer system chosen, the reinforcing particles (preferably fibrils) are mixed with one or both of the prepolymers used to form the polymer, and then the prepolymers mixed together. Dispersants/surfactants such as polymeric fatty ester, polyoxyethylene alcohol, ethoxylated methyl carbitol oleate, or ethoxylated alcohol may be added to the prepolymers along with the reinforcements, to facilitate mixing and dispersion of the reinforcements in the prepolymer(s). In the case of the polyurethane foams (which are made by reacting a polyol with a polyisocyanate), the reinforcement particles may be mixed either with the polyisocyanate prepolymer or the polyol prepolymer. Preferably, the particles will be added to the polyol which has a lower viscosity and hence permits a more ready mixing of the particles therewith. In the case of the silicone foams (which are made by a condensation reaction between silane and silanol-containing compounds), the particles may be mixed with either or both of the prepolymers, but preferably with the silanol for the same reasons as set forth above for the polyol. In either case during their reaction, bubbles are formed (i.e., $H_2$ in the silicone reaction, and $CO_2$ in the urethane reaction) which serve to foam the reactant during the polymerization reaction. The reactants can either generate their own bubbles or foaming agents can be added to the reactants to form the bubbles. The bubbles in the polymerizing mixture cause the polymer to foam and expand so as to fill the mold with an open-cell, sponge-like solid. The bubbles formed during the reaction of the prepolymers cause rearrangement of the fibrils along with the reacting prepolymers to sites bordering the bubbles. More specifically, during foaming a thin web of the reacting materials initially forms between each bubble. Eventually the web ruptures causing the material comprising the web to retract or consolidate into a plurality of randomly-oriented, thread-like structures interconnected one to the next via a plurality of nodes all together defining a plurality of interconnected, interstitial pores or cells. The reinforcement particles remain with the reactants (and the polymer formed therefrom) and accordingly retract with the reactants. Hence when the web ruptures and retracts, reinforcements become concentrated at the thread-like portions and nodes forming the reticulum to the exclusion of the pores/cells. Subsequent removal of the polymer leaves a three-dimensional reticulum wherein the reinforcing particles are concentrated at the wall segments of the solid foam, and, in the case of fibrils, have their major axes aligned with each other in the thread-like portions of the reticulum. More specifically, following completion of the polymerization reaction, the polymer-particle reticulum is preferably heated in air sufficiently to burn off the polymer (i.e., to about 1000° C. to remove urethane) and leave the particles in place. Thereafter, the residual particles are further heated to bond them together sufficiently to form a self-supporting preform. In one embodiment using $Al_2O_3$ fibril reinforcements, the particles are heated to at least about 1300° C. and preferably about 1500° C. to sinter the particles together. In another embodiment, the particles are coated with either colloidal silica or silica gel, prior to being mixed with the prepolymer. During heating, the $SiO_2$ precursor wicks to the nodes where the particles contact each other, bonds to adjacent similarly coated particles as well as promotes bonding of the aluminum matrix material to the particles. When silicone foams are used, Si—)—Si bonds are formed during the foaming reaction, and are comparable to $SiO_2$. Hence when silicone foams are used, the reinforcements do not require a separate addition of $SiO_2$ to the system to facilitate interparticle binding.

After the particles have been heated and bonded together, the preform is cooled and transferred to the mold/die used to form the finished product and therein impregnated/infiltrated with the desired matrix material. Pressure-casting (e.g., die casting or squeeze casting) is the preferred technique for impregnating the preform with metals such as aluminum or magnesium to make MMCs. In the case of CMCs, on the other hand, chemical vapor or liquid slurry infiltration techniques may be used as are well-known in the art. For example, in the case of chemical vapor impregnation, the preform may be exposed to flowing methyltrichlorosilane in a hydrogen gas carrier. At elevated temperatures, the gas decomposes on the preform surface essentially according to the reaction $SiCl_3CH_3(g) = SiC + 3HCl(g)$. This reaction can be carried out at about 981° C. and 6.7 kPa total gas pressure, using a gas comprising 16 percent $SiCl_3CH_3$ in $H_2$ flowing at a rate of about 1.7 liters/minute.

Ceramic reinforced composites made in accordance with the present invention provide wear-resistant MMCs and tough, fracture-resistant CMCs. In the case of the MMCs, the ceramic reinforcement is much harder than the light matrix metal (e.g., Al, Mg) embedding it, and accordingly provides wear resistance to the softer material. In the case of CMCs, the reinforcing particles serve to intercept and prevent the propagation of continuous cracks throughout the material that would otherwise form in, and cause the destruction of, brittle ceramics. For both applications, it is desirable that there be a high frequency of the ceramic reinforcement in any cross section of the material. Hence, it is desirable that the preform have an open-cell structure in which the cells are quite small. Accordingly, while it is possible to make reinforced composites according to the present invention in which the reticulum has pore sizes varying from about 30 to about 1500 microns, it is preferred that the pores/cells be less than about 150 microns in diameter. On the other hand, if the pore sizes are too small (i.e., less than about 50 microns in diameter), it becomes increasingly more difficult to impregnate it with molten metal at an acceptable rate.

THE FIGURES AND EXAMPLES

The invention will better be understood when considered in the light of the following detailed description of certain specific examples thereof, which are described hereafter in conjunction with the several Figures in which:

FIG. 1 is a draftsman's illustration of the structure of a three-dimensional, open-cell, reticulum in accordance with the present invention;

FIG. 2 is a scanning electron micrograph of a preform made in accordance with a preferred embodiment of the present invention (i.e., after removal of the polymer);

Figure 3:
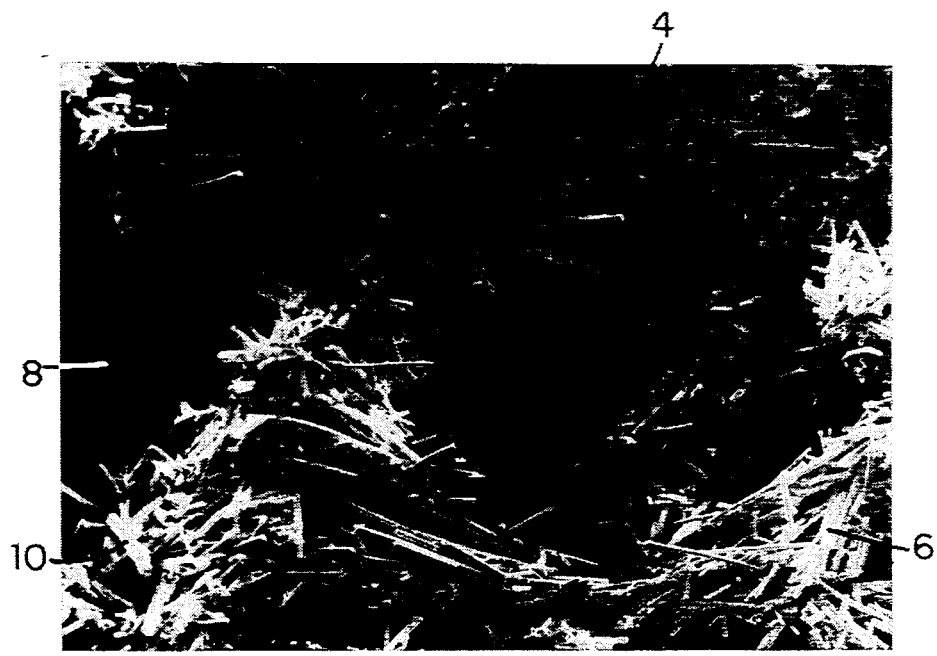
FIG. 3 is a higher magnification scanning electron micrograph of the preform of FIG. 2.

FIG. 1 is a draftsman's illustration of an open-cell reticulum of the type formed by the process of the present invention. The reticulum 2 comprises a plurality of thread-like portions 4 randomly oriented throughout the reticulum 2 and joined to adjacent thread-like portions 4 via a plurality of nodes 6 all defining a plurality of interconnected, interstitial pores/cells 8. As best shown in FIGS. 2 and 3, reinforcing particles 10 concentrate themselves at the thread-like portions 4 and nodes 6 of the reticulum 2 to the substantial exclusion of the interstitial pores/cells 8. Moreover, as best shown in FIG. 3, fibrilose particles tend to align themselves lengthwise along the thread-like portions 4 of the reticulum 2 and more randomly at the nodes as best shown in FIG. 3.

A number of samples were made using polyurethane foam as the reticulum-forming polymer, fibrilose $Al_2O_3$ as the reinforcing particles, particle loadings varying from 0 to 18.1 percent by weight of the combined polyurethane-particle mix, and using essentially known RRIM (i.e., reinforced reaction injection molding) techniques followed by polymer removal (i.e., burn-out) and fibril bonding steps to form a self-supporting preform. The fibrilose $Al_2O_3$ used was commercially available from ICI America's Inc. under the trade name "Saffil" which contains $Al_2O_3 \cdot SiO_2(4\% \ SiO_2)$ fibrils. Saffil fibers initially vary in length from about 13000 microns to about 51000 microns and are 3.0 microns in diameter. These fibers are chopped into fibrils having lengths of about 75 microns to about 100 microns. Preforms made therefrom contained up to 3.8 volume percent Saffil fibrils. In connection with the fabrication of such samples, it was observed generally that, (1) when foaming was allowed to occur unconstrained, the degree of expansion decreased with increasing fibril content, (2) that moist fibrils caused greater expansion than dry fibrils, and (3) that unconstrained foams shrunk considerably when the polymer was burned out. When foaming took place in a closed reaction chamber, akin to a mold cavity, the resultant preforms (1) had a much finer cell size than the unconstrained foams, (2) did not shrink appreciably upon burn-out, (3) contained 3.1 volume percent fibrils (i.e., after polymer burn-out), and (4) were readily impregnable with aluminum alloy without crushing or collapsing of their reticulated structure.

More specifically, the several samples were made using a polyurethane foam making system marketed by the ICI Polyurethanes Group of ICI America's Inc. under the trade designation XRS-8221. This particular polyurethane system has an expansion ratio of about 10 to 1 (i.e., the volume of the foam is about 10 times the volume of the prepolymer reactants), and yields open-cell foams. The XRS-8221 system's formulation involves two prepolymer components, i.e., RIM 8900A and XRS-8901B. RIM 8900A contains about 65 percent by weight 4,4'-diisocyanato diphenylenemethane and about 35 percent oligomers having a similar structure. XRS-8901B is a blend of polyols and glycerine. Such reactants are typical of other polyurethane foam systems and are generally referred to in the art as the "diisocyanate" and "polyol" reactants respectively.

The XRS-8221 material was first foamed without the addition of any reinforcements. The amount of expansion was calculated from the "zero porosity" density of the polyurethane which was reported by the supplier to be 1.22 grams/cc, and the measured bulk density of the finished foam (i.e., 0.09 grams/cc). Using this approach, the calculated expansion was 1100 percent. The foam appeared to be essentially open-cell though perhaps some closed cells were still present. The foam was uniform and had interstitial cell sizes ranging from about 100 to about 1000 microns in diameter. Thermogravimetry (hereinafter TGA) was performed on the foam in flowing air to determine the affects of temperature thereon. It was observed that weight loss occurred primarily in two stages. The first being between 300°–420° C., and the second being between 450°–650° C. The remaining 10 percent of the urethane disappeared by the time 1000° C. was reached. The same weight loss pattern was observed for all the other samples tested including those containing the $Al_2O_3$ fibrils. Accordingly it was concluded that heating to 1000° in flowing air was sufficient to completely remove the polyurethane.

In the remaining samples, Saffil fibrils were used as the reinforcing phase and were mixed in a food-type blender with either or both of the prepolymers depending on the particular sample. The fibrils were dried for eight hours at 950° C. and stored in a desiccator prior to mixing with the prepolymer. The diisocyanate and polyol prepolymers were temperature equilibrated in water baths at 25° C. and stirred separately prior to mixing. The stirring was found to be particularly advantageous with the "polyol" reactant because of the tendency for the glycerine to separate out. 1.05 parts by weight diisocyanate was mixed with one part by weight polyol. Some samples were reacted in an open cup to allow unconstrained foaming whereas others were foamed in a capped cup to simulate a closed system comparable to a closed mold/die cavity for confining the reactants during foaming. After foaming, the urethane was burned out and the remaining particles heated to bond them together. Following burn-out and bonding of the fibrils, the $Al_2O_3$ reticulum remaining was characterized in a scanning electron microscope.

All in all six foams were prepared using varying amounts of Saffil fibrils. Five of the samples were allowed to expand freely while the sixth sample was contained/confined (i.e., in a capped cup) during reaction to limit its expansion and to simulate the conditions that would occur in a closed mold/die.

EXAMPLE A

A fibril reinforced sample was prepared by mixing 52.0 grams of diisocyanate with 47.4 grams of polyol. Saffil fibrils were first added to the diisocyanate in an amount equal to 12 percent by weight of the diisocyanate (i.e., 4 percent by volume of the mixture) which yielded a very gelatinous material. When mixed with the polyol, the fibril content of the mixture was 6.8 percent by weight. Upon mixing with the polyol, foaming occurred and the mix expanded to about 1100 percent of the unexpanded volume of the constituents. The resulting foam was a three-dimensional, open-cell reticulum characterized by some voids, as well as larger pores and a wider cell size distribution than was observed in the polyurethane foam made without the fibrils present. TGA was performed on separate pieces of the foam taken at three different locations in the foam mass. Despite significant variations in porosity throughout the foam, the fibril loading remained relatively uniform with the measured residual weights of the different pieces being 7.1 percent, 7.1 percent and 6.4 percent which is good agreement among the samples and generally consistent with the initial fibril content of 6.8 percent. The foam's bulk density was about 0.1 grams/cc. Using this value and the supplier reported density of 1.22 grams/cc for polyurethane and 3.3 grams/cc for the Saffil, the fibril content was calculated to be 0.2 percent by volume before the polyurethane was removed. The sample was heated in air to 1000° C. to remove the polyurethane, which resulted in shrinkage of the foam by approximately 70 percent. Little, if any, shape change (distortion) occurred as result of the shrinkage. Considering the shrinkage, the estimated volume occupied by the fibrils in the preform after burn-out was about 0.7 percent and resulted in a rather fragile preform.

EXAMPLE B

This sample was made by reacting 49.0 grams of diisocyanate with 48.3 grams of polyol, but with the Saffil fibrils premixed with the polyol prior to the reaction. A much higher loading of Saffil fibrils was used and resulted in a foam which was a three-dimensional, open-cell reticulum containing 18.1 percent by weight fibers and having a density of 0.37 grams/cc. The foaming reaction was slower than the earlier samples, and the surface of the foam remained tacky for about 15 minutes after the reaction should have been complete. The foam expanded only about 175 percent, had a variable porosity and yielded a preform having a fibril content of 3.8 percent by volume. The TGA behavior of this foam was identical to that of the previous foams except that the retained weight after removal of the polyurethane was 18.5 percent which was in excellent agreement with the original loading of 18.1 weight percent. The foam shrunk only 50 percent during removal of the polyurethane. FIG. 2 is a SEM micrograph of the Example B preform following burning out of the polyurethane, and clearly shows the sponge-like, open-cell, three-dimensional reticulum of fibrils which remains after the removal of the polyurethane. FIG. 3 is the same reticulum as shown in FIG. 2 but at a higher magnification. FIG. 3 shows the alignment of the several fibrils 10 with each other and the concentration thereof along the axes of the thread-like portions 4 extending between the nodes 6 of the reticulum 2. This alignment of the major axes of the fibrils 10 with the long axes of the thread-like portions 4 of the reticulum 2 was indeed surprising since prior to foaming the fibrils 10 were randomly oriented throughout the polyol. Hence, alignment of the fibrils 10 with the thread-like portions 4 and each other occurred during the foaming process by the action of the bubbles acting on the fibrils 10. As clearly shown from the SEM, the fibrils 10 are concentrated at the reticulum structure itself leaving large pores/cells 8 therebetween which are substantially free of any reinforcements. Hence while the overall fibril loading of the foam is about 3.8 percent by volume, the fibril loading/concentration in the reticulum itself is significantly higher.

EXAMPLE C

In another sample, 44 grams of diisocyanate were mixed with 43 grams of polyol containing 6.9 grams of Saffil fibrils which upon foaming yielded a three-dimensional, open-cell reticulum comprising 8.2 weight percent fibers (i.e., 0.7 percent by volume). The constituents expanded by about 1200 percent during the foaming reaction and yielded a foam having a density of 0.09 grams/cc. While the resulting foam had a more uniform pore distribution than sample A, the cell size and size distribution was still larger than had been obtained with the fibril-free foam. The TGA behavior of this foam was similar to that observed for the other foams tested.

EXAMPLE D

Still another sample was prepared from 49 grams diisocyanate and 48.3 grams of polyol containing 21.5 grams of wet Saffil (i.e., 0.5 percent moisture). The 21.5 grams of Saffil corresponded to 18.1 weight percent of the fibrils in the finished foam. This test was performed to determine the effects of water since water can react directly with diisocyanate to produce $CO_2$. The fibrils were moistened by enclosing them for three days in a desiccator which contained a beaker of water. The TGA analysis of the resulting fibrils showed that water absorption was approximately 0.5 percent of the fibril weight. Subsequent processing was identical to that described in Example B. The foam produced by this test was a three-dimensional reticulum which expanded over twice as much as the foam produced in Example B, but only about half that produced in Examples A and C. Upon removal of the polyurethane, the foam yielded a preform containing about 2.0 percent by volume fibrils and a pore size similar to that found in Example B.

EXAMPLE E

Finally, a sample was prepared from 75.0 grams of diisocyanate and 71.0 grams of polyol containing 32.3 grams of Saffil fibrils which produced a finished foam which was a three-dimensional, open-cell reticulum containing 18.1 weight percent fibrils. These reactants were placed in a closed container having a volume of about 250 cc so as to confine the expansion to that volume. This volume was about 25 percent greater than volume of the prepolymer/fibril mixture. Thus, expansion was limited to about 25%, which is considerably less than was observed with the open container. Following the reaction, the foam was left in the container for 18 hours and then removed by cutting away the container from the foam. The foam had a density of 0.63 grams/liter, a fine uniform porosity, average pore sizes of about 100 microns, and yielded a preform containing 3.1 volume percent of the fibrils. The resulting foam was softer than the foams which were allowed to freely expand. During TGA removal of the polyurethane, some sagging was observed though shape retention as a whole was good. After the urethane was burned off at 1000° C., the residual ceramic reticulum was sintered at 1500° C. for four hours to bond the fibrils to each other and thereby increase the rigidity of the preform.

EXAMPLE F

Figure 4:
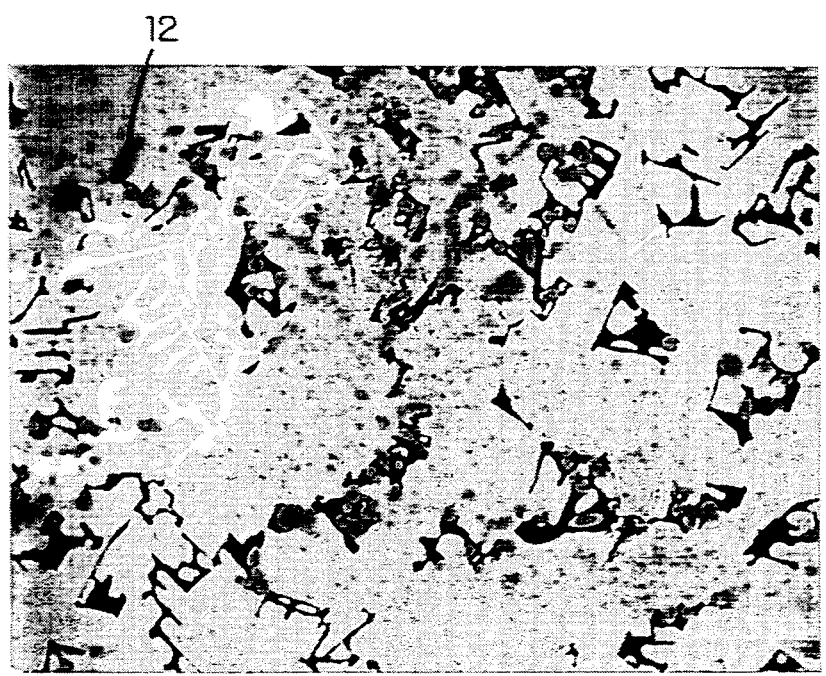
FIG. 4 is a back-scattered electron image of a cross-section of a ceramic preform made in accordance with the present invention, which has been impregnated with aluminum alloy.

The preform formed in Example E was subsequently impregnated with an aluminum alloy containing 10 weight percent magnesium and 5 weight percent silicon. More specifically, the preform was set atop a solid disk of the alloy in an alumina crucible and heated to 900° C. in flowing nitrogen for 15 hours. The aluminum wetted the fibrils and wicked into the preform. After cooling, the sample was sectioned and analyzed with Electron Probe Micro Analysis (EPMA) and SEM. FIG. 4 shows a cross-section of the thusly impregnated preform and shows that the reticulated structure of the preform is preserved during impregnation. An EPMA elemental map for oxygen in the same area shows that the circular features 12 in FIG. 4 are high in oxygen content relative to the Al matrix which is consistent with the presence of $Al_2O_3$ thereat. More specifically, EPMA elemental analysis shows these circular features 12 to be $MgAl_2O_4$ indicating at least some reaction with the Mg present.

While the invention has been disclosed primarily in terms of specific embodiments thereof it is not intended to be limited thereto, but rather only to the extent set forth hereafter in the claims which follow.

The embodiments of the invention in which an exclusive property or privilege is claimed as defined as follows:

1. A heterogeneous, reinforced material comprising a matrix phase embedding a reinforcement phase, said matrix phase selected from the group consisting of metals and ceramics, and said reinforcement phase comprising a multiplicity of discrete reinforcement particles arranged and bonded together so as to form a three dimensional open cell reticulum comprising a plurality of randomly oriented thread-like portions interconnected one to the next via a plurality of nodes and defining a plurality of interconnected, substantially particle-free, interstitial cells filled with said matrix phase.

2. A material according to claim 1 wherein said reinforcement phase consists essentially of a ceramic and comprises about 3 to about 30 percent by volume of said material.

3. A material according to claim 1 wherein said reticulum comprises a plurality of randomly oriented thread-like portions interconnected one to the next via a plurality of nodes.

4. A material according to claim 1 wherein said particles are fibrils having an aspect ratio of between about 3 and about 20.

5. A material according to claim 4 wherein said fibrils are substantially aligned with adjacent fibrils in said thread-like portions.

6. A material according to claim 4 wherein said particles are selected from the group consisting of $Al_2O_3$, $Al_2O_3.SiO_2$, SiC and $K_2O.6TiO_2$.

7. A material according to claim 4 wherein said fibrils vary in length between about 50 and about 200, and have diameters less than about 10 microns.

8. A material according to claim 1 wherein said matrix comprises a metal selected from the group consisting of aluminum and magnesium, and said particles are selected from the group consisting of $Al_2O_3.SiO_2(4\% SiO_2)$ and $Al_2O_3.SiO_2(53\% SiO_2)$.

9. A material according to claim 8 wherein said particles are fibrils having an aspect ratio less than about 20.

10. A material according to claim 8 wherein said cells vary in size from about 100 microns to about 200 microns in diameter.

11. A material according to claim 1 wherein said particles are bonded together by sintering.

* * * * *